2 Sheets—Sheet 1.

J. H. MELICK.

Assignor to WHEELER, MELICK & Co.

Horse Hay-Rake.

No. 8,279. Reissued June 11, 1878.

Witnesses { Alex. Selkirk
Charles La Dow

James H. Melick
Inventor.

N. PETERS, PHOTO-LITHOGRAPHER, WASHINGTON, D. C.

J. H. MELICK.

Assignor to WHEELER, MELICK & Co.

Horse Hay-Rake.

No. 8,279. Reissued June 11, 1878.

Witnesses. { Alex. Pettrick
Charles La Dow

James H. Melick
Inventor.

UNITED STATES PATENT OFFICE.

JAMES H. MELICK, OF ALBANY, NEW YORK, ASSIGNOR TO WHEELER, MELICK & CO.

IMPROVEMENT IN HORSE HAY-RAKES.

Specification forming part of Letters Patent No. 177,870, dated May 23, 1876; Reissue No. 8,279, dated June 11, 1878; application filed August 29, 1877.

*To all whom it may concern:*

Be it known that I, JAMES H. MELICK, of the city and county of Albany, in the State of New York, have invented certain new and useful Improvements in Horse Hay-Rakes, which improvements are fully described in the following specification and accompanying drawings, in which—

Figure 1:
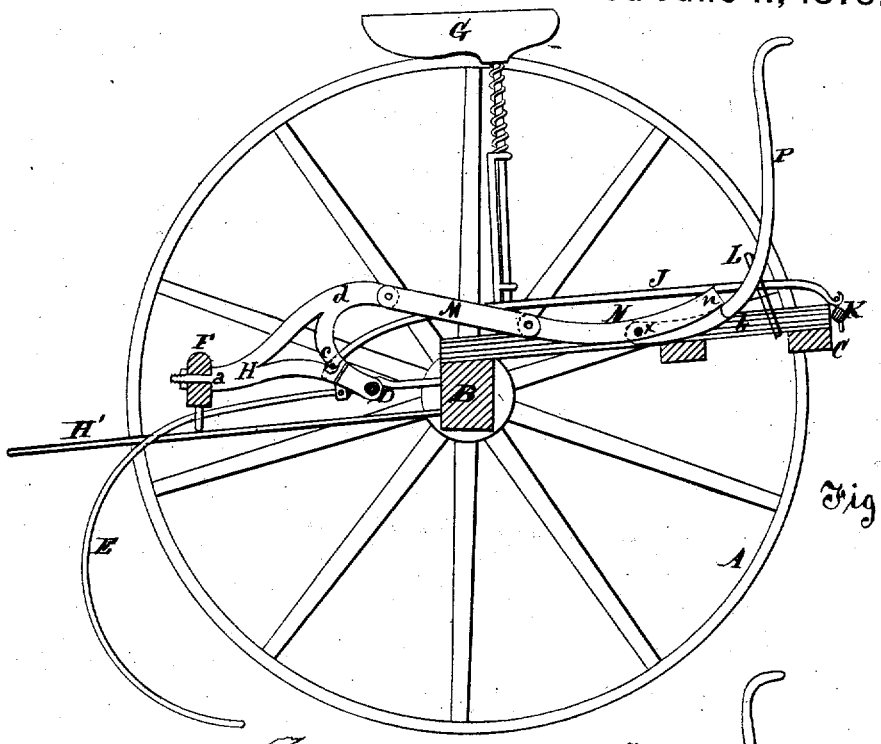
Figure 2:
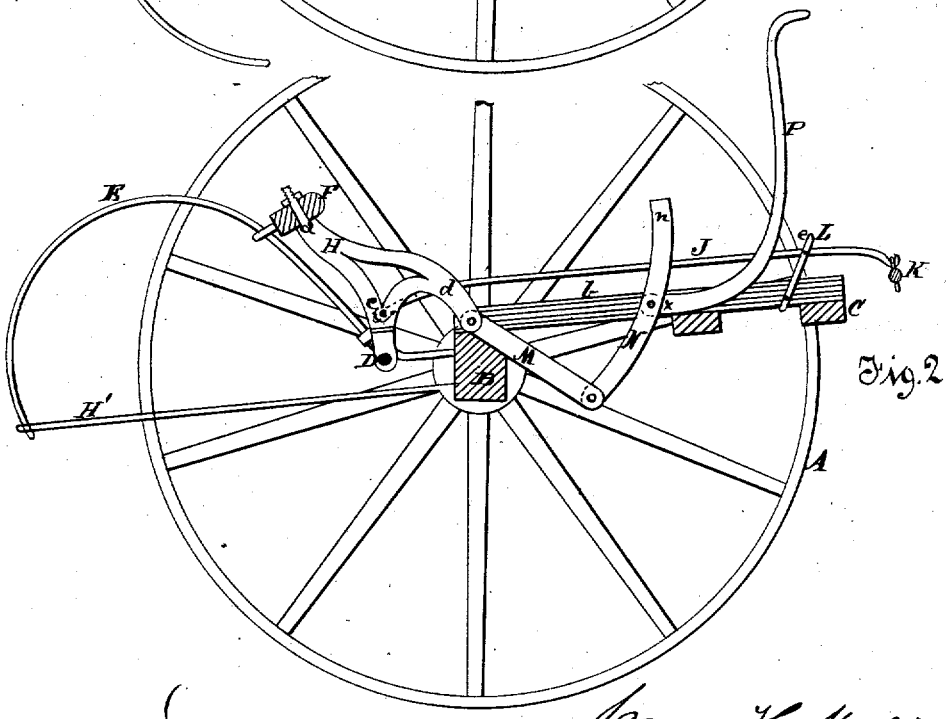
Figure 3:
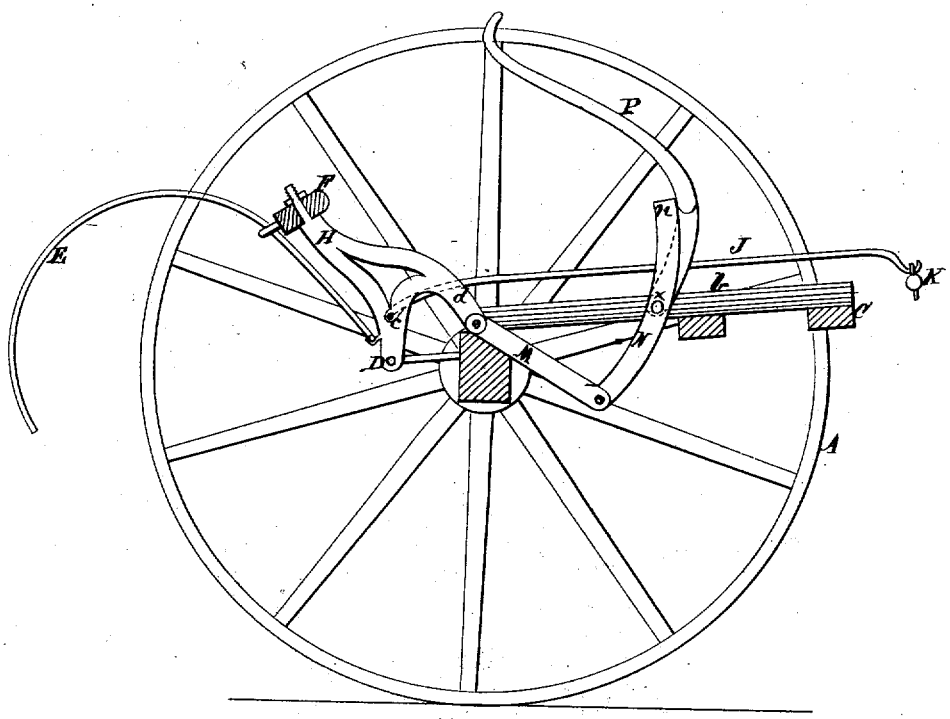
Figure 4:
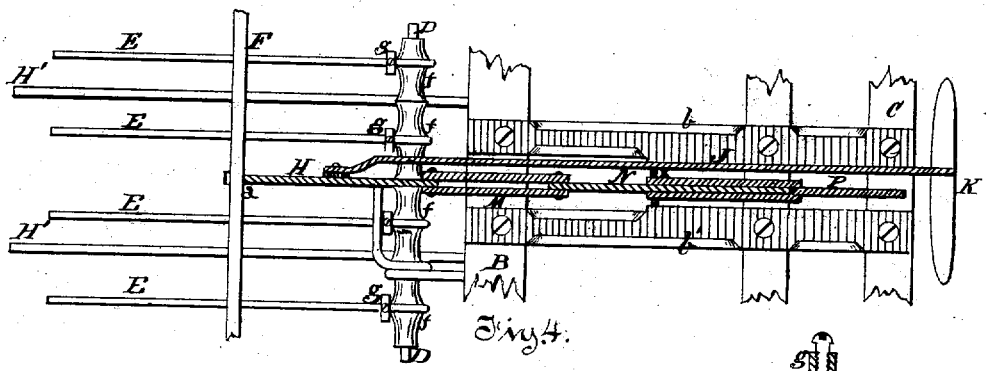
Figure 5:
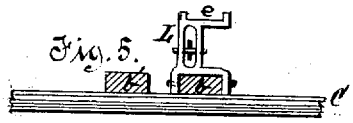
Figure 6:
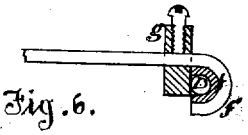

Figure 1, Sheet 1, represents a sectional elevation of the hay-rake embodying the improvements in this invention, with all the parts in position for the raking of hay. Fig. 2, Sheet 1, represents a sectional elevation of the rake when the parts are in position for dumping. Fig. 3, Sheet 2, represents a sectional elevation of the rake, illustrating the manner of raising the fingers or teeth by hand. Fig. 4, Sheet 2, is a plan view of the working parts of the rake. Fig. 5, Sheet 2, is a sectional view of the locking foot-lever; and Fig. 6 is a sectional elevation of the attached end of the fingers or teeth.

My invention consists in the devices and combination of parts, as hereinafter described and specifically claimed.

In the drawings, A A represent the wheels. B is the axle. C is the shaft-bar. D is the thimble-rod, to which the fingers E E are attached. F is the pressure-bar, also known as lifting-bar or staple-bar. G is the seat. H is the pressure-bar lever, connecting the pressure-bar with the thimble-rod. H′ H′ are the clearing-bars, all of which are old and well known.

The upper or outer end *a* of lever H is rigidly secured to the pressure-bar F, while the opposite end is pivoted to the thimble-rod D, so as to swing on the same. Pivoted to the pressure-bar lever H, as at *c*, is the draw-bar J, to the opposite end of which is attached the whiffletree K, to which the traces of the animal are attached. Pivoted to the bar *b*, running from the cross-bar of the shafts back to the axle, is the foot locking-lever L, which is also pivoted to the draw-bar at a point about midway between the bar *b* and the stirrup or foot-piece *e*, made with the upper end of said lever. Pivoted to the extension or limb *d* of the pressure-bar lever H is the connection-bar M, which connection-bar is pivoted at the opposite end to the foot-lever N. The foot-lever N is pivoted to the bars *b b′* at about its center of length, so that, when the free end *n* is thrown back from position shown in Fig. 1 to that shown in Fig. 2 by the foot of the driver, the said lever will be made to raise the pressure-bar F and the teeth or fingers E, through the medium of the adjuncts H and M, as shown. Pivoted also to bars *b b′* is the hand-lever P, the free end of which may be thrown from position shown in Fig. 1 to that shown in Fig. 3, and when so thrown will effect a raising of the finger or a dumping of the rake by operating the foot-lever N, so as to cause it to draw on the connection M, operating with the pressure-bar lever H.

The several fingers E E are attached to the thimble-rod D in such a manner that any one of the said fingers may be readily removed from said thimble-bar and also from the pressure or lifting bar without necessitating the removal of any of adjoining fingers. To effect the necessary attachment of the several fingers to the thimble-bar, and readily remove any or more of the same, I employ the thimbles *f f* and set-washers *g g*, Figs. 4 and 6. Each of said thimbles receives a finger, which finger is held in place by the bent terminating end *f′* engaging with the front-side portion of the thimble and the set-washer *g*, secured to the finger and locking with the rear-side portion of the same. The said fingers, thus separately and independently secured, are held by the pressure-bar or lifting-bar F at a short distance back from the thimble-rod in such a manner that they may all be raised or pressed down simultaneously, as circumstances may require.

The operation of the rake is as follows: The driver on the seat G places his foot on the locking-lever L or foot-lever N, as he may select, and by constant pressure keeps the rake-fingers down to their work until a sufficient quantity of hay has been gathered. When the hay is to be discharged by the power of the animal drawing the rake, the driver will give to the locking-lever a slight impulse forward, or to the foot-lever a slight impulse backward, when the draft of the animal on the draw-bar J will pull the same forward and exert a draft on the pressure-bar lever H swinging on the thimble-bar D, when the pressure or lifting bar F, with the several fingers E E, will be thrown to position of full lines in Fig. 2, and the hay be discharged.

When the driver desires to suddenly raise the fingers to clear any obstruction, he will throw the hand-lever P from position shown in Fig. 1 to that in Fig. 3, and at the same time by his foot throw the foot-lever back or the locking-lever forward, while the draft of the animal will at the same time be exerted on the draw-bar J, when the pressure or lifting bar with the fingers will be quickly raised. When backing the rake the pressure of the locking-bar forward or foot-bar backward will hold the pressure or lifting bar with its fingers up from contact with the ground.

Having described my invention, what I claim, and desire to secure by Letters Patent, is—

1. The rocking foot-lever L, for holding the teeth in raking or elevated position, in combination with the draft-bar J, operating with the adjuncts employed to raise the fingers, substantially as set forth.

2. The rocking foot-lever L, in combination with draft-bar J, for holding the teeth in raking or elevated position, substantially as described.

JAMES H. MELICK.

Witnesses:
ALEX. SELKIRK,
CHARLES LA DOW.